United States Patent
Rosa-Miranda

Patent Number: 5,092,208
Date of Patent: Mar. 3, 1992

[54] HOT KNIFE ASSEMBLY

[75] Inventor: Roberto Rosa-Miranda, Dover, N.H.

[73] Assignee: Davidson Textron Inc., Dover, N.H.

[21] Appl. No.: 623,693

[22] Filed: Dec. 7, 1990

[51] Int. Cl.⁵ .............................................. B26D 7/10
[52] U.S. Cl. ........................................ 83/171; 219/68; 219/221; 425/292; 425/298
[58] Field of Search ................... 83/171; 219/68, 201, 219/221, 229; 425/289, 292, 298

[56] References Cited

U.S. PATENT DOCUMENTS

| 525,028 | 8/1894 | Pusey | 83/171 |
|---|---|---|---|
| 3,054,441 | 9/1962 | Gex et al. | 83/171 |
| 3,964,850 | 6/1976 | Carnegie, Jr. | 425/292 |
| 3,986,416 | 10/1976 | Wade | 83/171 |
| 4,215,607 | 8/1980 | Hudson et al. | 156/575 |
| 4,860,621 | 8/1989 | Totani | 83/171 |

FOREIGN PATENT DOCUMENTS

| 1042887 | 11/1958 | Fed. Rep. of Germany | 425/292 |
|---|---|---|---|
| 2833578 | 2/1980 | Fed. Rep. of Germany | 425/292 |
| 2268105 | 11/1975 | France | 83/171 |

Primary Examiner—Jay H. Woo
Assistant Examiner—C. Scott Bushey
Attorney, Agent, or Firm—John P. Moran

[57] ABSTRACT

A hot knife assembly for cutting excess organic polymeric material from a thermal forming mold includes a blade-like knife in the form of a thin flat plate having an inner edge connected to a heater and an outer edge with a cutting surface thereon. The thin flat plate has two flat surfaces substantially encapsulated by a refractory wedge. The refractory wedge in formed silicone material and extends coextensive and adjacent the blade-like knife for preventing stringing or re-welding of the cut material.

1 Claim, 2 Drawing Sheets

HOT KNIFE ASSEMBLY

TECHNICAL FIELD

This invention relates to a hot knife assembly for cutting sheet material. More specifically, this invention relates to a hot knife assembly for cutting excess organic polymeric material from a mold.

BACKGROUND ART

Hot knives are typically used to simultaneously melt and sever sheet material such as organic polymeric material. A sharp edge is heated and brought into contact with the material, thereby melting the material along the line created by the sharp edge. However, two problems are known to exist with such hot knives.

One problem exists when the heated knife clings to the sheet material thereby causing stringing or re-welding of the severed material. U.S. Pat. No. 4,215,607 issued to William G. Hudson, et al on Aug. 5, 1980, discloses a hot knife including a wedged shape knife for severing the sheet material. The wedge shaped knife provides better severing of the sheet material, however, it has been found that since there is no refractory material, there is no cooling on the sheet material and thus the material tends to adhere to the blade and create stringing.

The U.S. Pat. No. 3,054,441 issued to Virgin E. Gex et al on Sept. 18, 1962, discloses a hot knife including a heated wire element positioned at an apex of a ceramic wedge. The wire is displaced through the sheet material thereby allowing the ceramic wedge to cool the severed material. Thus, stringing is prevented and a return path for the hot wire is created. However, it has been found that heating elements such as a wire, do not keep constant operating temperatures. The wire temperature has been found to constantly fluctuate between each severing process.

DISCLOSURE OF THE INVENTION

A general object of the invention is to provide an improved hot knife assembly.

Another object of the invention is to provide a hot knife assembly for cutting material, including an elongated blade-like knife means, a heating means for applying heat to the blade-like knife means, and a refractory wedge substantially encapsulating the blade-like knife means for preventing the cut material from adhering to the blade-like knife means.

These and other objects and advantages of the present invention will become apparent when reference is made to the following drawings in the accompanying description.

BEST MODE OF CARRYING OUT THE INVENTION

Figure 1:
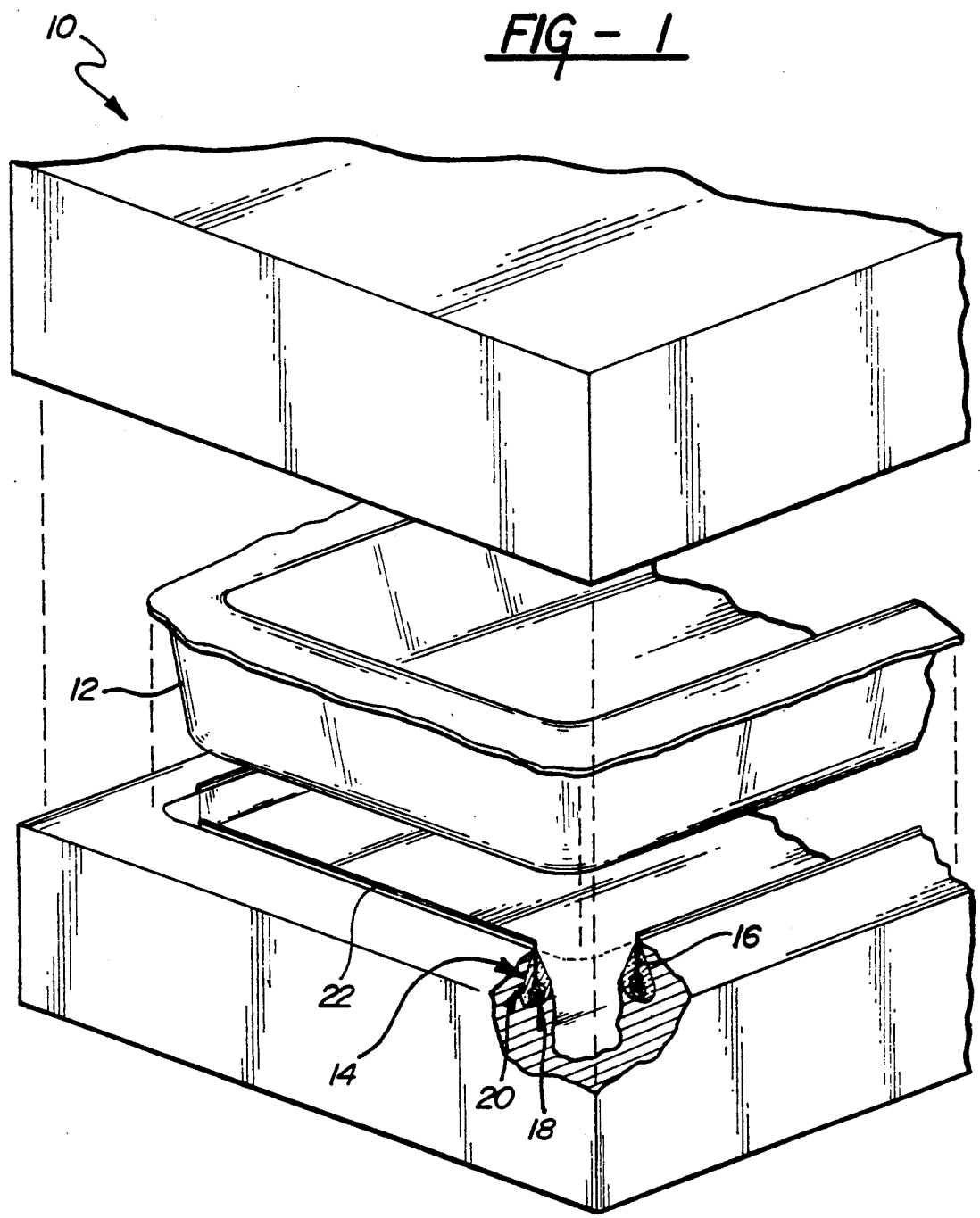
FIG. 1 is a fragmentary perspective view of the subject invention in use with a mold assembly.

Referring to the drawings in greater detail, FIG. 1 illustrates a mold 10 wherein a part 12 is formed of an organic polymeric material, such as Surlyn. A hot knife assembly 14 is mounted in the mold so as to trim excess Surlyn from the part 12, while preventing the Surlyn from sticking on the knife edge.

Figure 2:
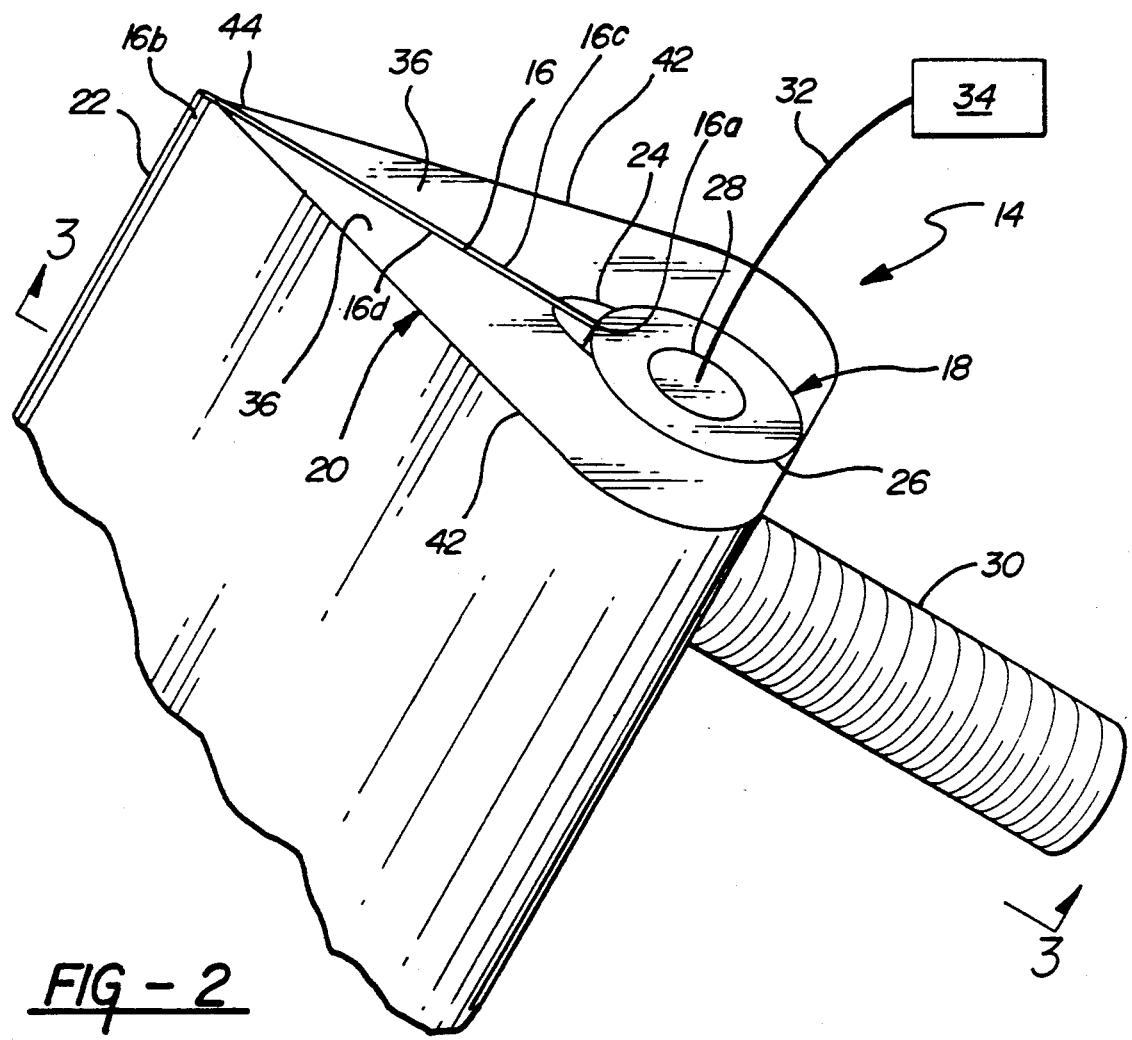
FIG. 2 is a fragmentary perspective view of the subject invention.
Figure 3:
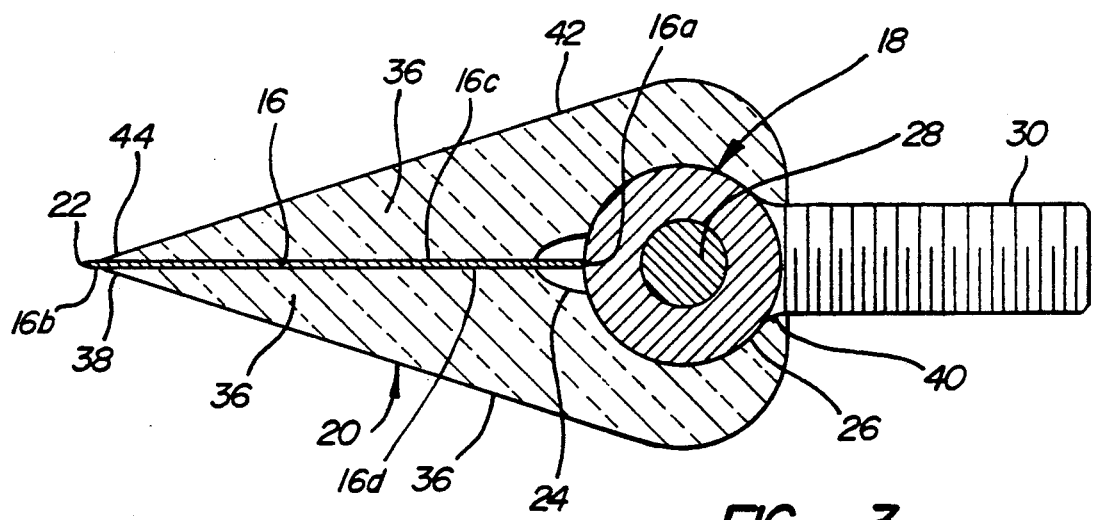
FIG. 3 is a cross-sectional view taken along the plane of the line 3—3, and looking in the direction of the arrows.

The hot knife assembly 14 includes an elongated blade-like knife means 16, which may be steel rule die, and formed from brass shim stock, heating means generally indicated at 18, and a refractory wedge generally indicated at 20. As best shown in FIG. 2, the blade like knife means 16 is a thin flat plate 16 having an inner edge 16a, an outer edge 16b and two flat surfaces 16c and 16d. The blade-like knife means 16 is comprised of a brass material and includes a cutting edge 22 for severing the Surlyn.

The blade-like knife means 16 is attached to the heating means 16 by a high temperature solder bead 24 at the inner edge 16a. The heating means 18 includes an elongated cylindrical copper tube 26 and an electrical heating element 28 extending through the copper tube. The copper tube 26 is connected to a suitable fastener, such a stud 30 at a point circumferentially opposite from the solder bead 24. It is the stud 30 which serves to anchor the hot knife assembly 14 in the mold 10.

The electrical heating element 28 is suitably connected by a flexible conduit represented in FIG. 2 as 32, to a power source represented as 34, for energizing the element 28.

The refractory wedge 20 is preferably made from RTV silicone, manufactured by the Dow Corning Corporation, substantially encapsulating the blade-like knife means 16. The refractory wedge 20 includes a pair of wedge halves 36 extending co-extensively adjacent the elongated blade-like means 16. The wedge halves 36 include an internal surface having a first end 38 defined by the cutting edge 22 of the blade-like knife means 16, and a second end 40 disposed about the heating means 18. The second end 40 of the wedge halves 36 has the copper tube disposed laterally therein. The wedge halves 36 further include an external ramping surface 42 culminating in a apex 44 adjacent the cutting edge 22. The refractory wedge 20 is comprised of a silicone material that prevents the organic polymeric material from adhering to the blade-like knife means 16.

In operation, the electrical heating element 28 provides electrical resistance heat to the copper tube 26, which acts as a heat sink to provide stable and uniform heat to the blade-like knife means 16.

INDUSTRIAL APPLICABILITY

It should be apparent that the uniformly heated blade-like knife means 16, as a steel rule is formed to have a shape corresponding to the shape of a marginal portion of a sheet of polymeric material, and secured by the stud 30 to the mold 10 for fixing the knife edge or apex 44 in a position to trim the margin. Inasmuch as the steel rule is substantially encapsulated by the silicone refractory wedge 20, the latter serves to reduce friction so as to smoothly sever and melt any excess organic polymeric material disposed in the forming mold lo without any sticking to the ramping surfaces 42 of the silicone wedges halves 36.

It should be further apparent that, while the blade-like knife means is shown as a straight edge, it, of course, may be formed in any shape to conform to irregular shaped molds.

The invention has been described in an illustrative manner, and it is to be understood that the terminology which has been used is intended to be in the nature of words of description rather than of limitation.

While but one embodiment of the invention has been shown and described, other modifications thereof are possible within the scope of the appended claims, wherein reference numerals are merely for convenience and are not to be in any way limiting.

What is claimed is:

1. In a hot knife assembly having a cylindrical tube surrounding a resistance heater for heating the knife the improvement comprising:

a thin flat plate having an inner edge, an outer edge and two flat surfaces;

a solder bead connecting said inner edge to said cylindrical tube for conducting heat from said cylindrical tube to said thin plate;

said outer edge having a cutting surface thereon;

a first wedge half of silicone fully covering one of said flat surfaces and a second wedge half of silicone fully covering the other of said flat surfaces; each of said first and second halves culminating in an apex adjacent said cutting surface.

* * * * *